United States Patent
Rathineswaran

(10) Patent No.: US 10,305,740 B2
(45) Date of Patent: May 28, 2019

(54) SYSTEM AND METHOD FOR PERFORMING MASS RENAMING OF LIST OF ITEMS AT RUN-TIME WITH VARIABLE DIFFERENTIATION FACTOR

(71) Applicant: American Megatrends, Inc., Norcross, GA (US)

(72) Inventor: Chandrasekar Rathineswaran, Duluth, GA (US)

(73) Assignee: AMERICAN MEGATRENDS, INC., Norcross, GA (US)

( * ) Notice: Subject to any disclaimer, the term of this patent is extended or adjusted under 35 U.S.C. 154(b) by 225 days.

(21) Appl. No.: 15/467,391

(22) Filed: Mar. 23, 2017

(65) Prior Publication Data
US 2018/0278472 A1    Sep. 27, 2018

(51) Int. Cl.
*H04L 12/24* (2006.01)

(52) U.S. Cl.
CPC ...... *H04L 41/0889* (2013.01); *H04L 41/0813* (2013.01)

(58) Field of Classification Search
None
See application file for complete search history.

(56) References Cited

U.S. PATENT DOCUMENTS

| | | | |
|---|---|---|---|
| 8,370,403 B2* | 2/2013 | Matsuki | G06F 3/0482 707/821 |
| 2003/0018644 A1* | 1/2003 | Bala | G06F 17/246 |
| 2006/0174054 A1* | 8/2006 | Matsuki | G06F 3/0482 711/100 |
| 2011/0314451 A1* | 12/2011 | Baumann | G06F 9/454 717/125 |
| 2014/0181159 A1* | 6/2014 | Balakrishnan | G06F 17/30265 707/821 |
| 2017/0344574 A1* | 11/2017 | Mason | G06F 17/30123 |

* cited by examiner

*Primary Examiner* — Brian Whipple
(74) *Attorney, Agent, or Firm* — Locke Lord LLP; Tim Tingkang Xia, Esq.

(57) ABSTRACT

Systems and methods for performing mass renaming of a list of items at run-time with variable differentiation factors, which may be applied to a management device managing the list of items. The management device provides multiple predetermined dynamic keys for the list of items to be renamed, where each of the predetermined dynamic keys has a corresponding differentiating value for each item. For example, properties of the items may be used as the predetermined dynamic keys. Then, the management device may receive an instruction from a user for renaming the list of items. The instruction may include information for selecting at least one of the predetermined dynamic keys to be used in the renaming process. In response to the instruction, the management device may perform a renaming process at run-time to rename the items using the predetermined dynamic keys being selected.

20 Claims, 3 Drawing Sheets

SYSTEM AND METHOD FOR PERFORMING MASS RENAMING OF LIST OF ITEMS AT RUN-TIME WITH VARIABLE DIFFERENTIATION FACTOR

FIELD

The present disclosure relates generally to automated renaming technology, and more particularly to systems and methods for performing mass renaming of a list of items at run-time with variable differentiation factors.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Generally, renaming a list of items, such as a set of devices in a data center management station, could be a tedious process at run time because of tens of thousands of devices. Renaming everything at once could result in ambiguous entities among the list of items.

Therefore, an unaddressed need exists in the art to address the aforementioned deficiencies and inadequacies.

SUMMARY

Certain aspects of the disclosure direct to a system, which includes a management device configured to manage a list of items. The management device includes a processor and a memory storing computer executable code. The computer executable code, when executed at the processor, is configured to: provide a plurality of predetermined dynamic keys for the list of items, wherein each of the predetermined dynamic keys has a corresponding differentiating value for each item in the list of items; receive an instruction from a user for renaming the list of items, wherein the instruction comprises information for selecting at least one of the predetermined dynamic keys; and in response to the instruction, rename the items at run-time using the at least one of the predetermined dynamic keys being selected.

Certain aspects of the disclosure direct to a method for performing mass renaming of a list of items at run-time with variable differentiation factors, which includes: providing, by a management device, a plurality of predetermined dynamic keys for a list of items, wherein the management device is configured to manage the list of items, and each of the predetermined dynamic keys has a corresponding differentiating value for each item in the list of items; receiving, by the management device, an instruction from a user for renaming the list of items, wherein the instruction comprises information for selecting at least one of the predetermined dynamic keys; and in response to the instruction, renaming, by the management device, the items at run-time using the at least one of the predetermined dynamic keys being selected.

Certain aspects of the disclosure direct to a non-transitory computer readable medium storing computer executable code. In certain embodiments, the computer executable code, when executed at a processor of a management device, is configured to: provide a plurality of predetermined dynamic keys for a list of items managed by the management device, wherein each of the predetermined dynamic keys has a corresponding differentiating value for each item in the list of items; receive an instruction from a user for renaming the list of items, wherein the instruction comprises information for selecting at least one of the predetermined dynamic keys; and in response to the instruction, rename the items at run-time using the at least one of the predetermined dynamic keys being selected.

In certain embodiments, the system further includes a computing device communicatively connected to the management device via a network, wherein the instruction is received by the management device from the computing device.

In certain embodiments, each of the predetermined dynamic keys is a property of the items.

In certain embodiments, each of the items is a node, and the predetermined dynamic keys comprise identification information of the node.

In certain embodiments, each node is a blade server, and the identification information comprises a slot identification number of the blade server.

In certain embodiments, the identification information includes: a group identification number of the node; an Internet protocol (IP) address of the node; a media access control (MAC) address of the node; a model of the node; and manufacturer information of the node.

In certain embodiments, the computer executable code, when executed at the processor, is further configured to: display the predetermined dynamic keys to the user.

In certain embodiments, the instruction further includes information for selecting, from a plurality of lists of items, the list of items to be renamed.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings, wherein.

DETAILED DESCRIPTION

Figure 1:
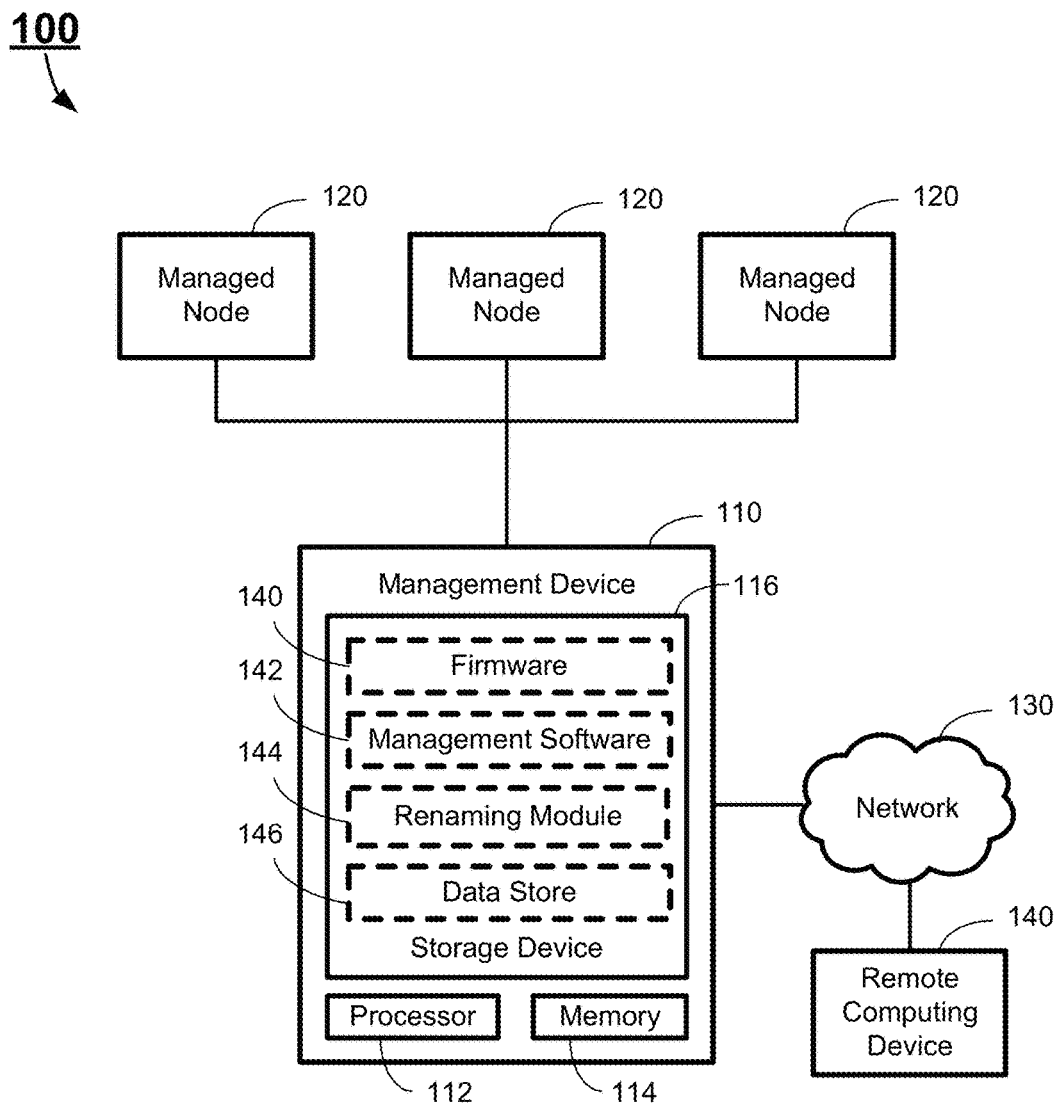
FIG. 1 schematically depicts an exemplary system according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in"

includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The terms "chip" or "computer chip", as used herein, generally refer to a hardware electronic component, and may refer to or include a small electronic circuit unit, also known as an integrated circuit (IC), or a combination of electronic circuits or ICs.

The terms "node" or "computing node", as used herein, generally refer to a basic unit of computer systems. A node may be implemented by a physical device or a virtual device. For example, a computing device such as a personal computer, a laptop computer, a tablet or a mobile device may function as a node. A peripheral device such as a printer, a scanner or a system on chip (SoC) may also function as a node. A virtual device, such as a virtual machine (VM), may also function as a node. When defining nodes on the Internet, a node refers to a device or a data point having an IP address.

The term "cluster", as used herein, generally refers to a set of loosely or tightly connected computing devices (or more precisely, computing nodes) that work together such that, in many respects, they can be viewed as a single system. The components of a cluster are usually connected to each other through a network, with each node of the cluster being set to perform certain tasks.

Certain embodiments of the present disclosure relate to computer technology. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Certain aspects of the present disclosure direct to systems and methods for performing mass renaming of a list of items at run-time with variable differentiation factors on a management device, which is configured to manage the items. In certain embodiments, in a management device functioning as a data center management station, the information of the properties of all the managed node are stored in the management device. Thus, these properties may be used as predetermined dynamic keys, which may be introduced to cause the differentiation factor in the renaming process. In certain embodiments, the predetermined dynamic keys can be any dynamic values already available in the database of the management device, thus allowing users to reuse the information without having to input the names of the managed nodes being renamed over and over again.

FIG. 1 schematically depicts an exemplary system according to certain embodiments of the present disclosure. As shown in FIG. 1, the system 100 includes a management device 110, which is specifically configured to manage a plurality of managed nodes 120. In particular, each of the managed nodes 120 should have a specific name being stored in the management device 110, such that users may recognize the identity of each managed node 120 by the name. Optionally, the system 100 may further include a remote computing device 140, which is communicatively connected to the management device 110 via a network 130, such that a user may remotely access the management device 110 through the remote computing device 140. For example, the management device 110 may function as a server, and the remote computing device 140 may function as a client, thus forming a client-server system, and a user at the remote computing device 120 may access the management software 142 and other applications provided on the management device 110. In certain embodiments, the network 130 may be a wired or wireless network, and may be of various forms. Examples of the network 130 may include, but is not limited to, a local area network (LAN), a wide area network (WAN) including the Internet, or any other type of networks.

The management device 110 is a specialized computing device configured to manage the managed nodes 120. In certain embodiments, the management device 110 may be a management controller used for specific management purposes. Examples of the management device 110 may include a chassis management controller, a rack management controller, a virtual machine management controller, a backplane controller, an enclosure management controller, or any other types of management devices. In certain embodiments, examples of the management device 110 may include a microcontroller based controller, a complex programmable logic device (CPLD) based controller, a field-programmable gate array (FPGA) based controller, or any combination thereof.

As shown in FIG. 1, the management device 110 includes a processor 112, a memory 114, and a storage device 116. Further, the controller 110 may include other hardware components and software components (not shown) to perform its corresponding tasks. For example, the management device 110 may include a network interface, such as a network interface card (NIC), which is used to connect the management device 110 to the network 130. Other examples of these hardware and software components of the management device 110 may include, but not limited to, other required memory, interfaces, buses, Input/Output (I/O) modules and peripheral devices.

The processor 112 is the processing core of the management device 110, configured to control operation of the management device 110. In certain embodiments, the processor 112 may be a central processing unit (CPU). In certain embodiments, the processor 112 may execute any computer executable code or instructions, such as the firmware 140, the management software 142 and the renaming module 144, or other applications and instructions of the management device 110. In certain embodiments, the management device 110 may run on more than one processor, such as two processors, four processors, eight processors, or any suitable number of processors.

The memory 114 can be a volatile memory, such as the random-access memory (RAM), for storing the data and information during the operation of the management device 110. In certain embodiments, the memory 114 may be a volatile memory array. In certain embodiments, the management device 110 may run on more than one memory 114.

The storage device 116 is a non-volatile data storage media for storing computer executable code or instructions for performing the operation of the management device 110. In certain embodiments, the computer executable code or instructions of the management device 110 may be implemented as one or more application programs or modules. Examples of the storage device 116 may include non-volatile memory such as flash memory, non-volatile random-access memory (NVRAM), memory cards, USB drives, hard drives, floppy disks, optical drives, or any other types of data storage devices. In certain embodiments, the management device 110 may have multiple storage devices 116, which may be identical storage devices or different types of storage devices, and the firmware 140, the management software 142, the renaming module 144, the data store 146, and other applications or data of the management device 110 may be stored in one or more of the storage devices 116 of the management device 110.

As shown in FIG. 1, the applications and data stored in the storage device 116 include the firmware 140, the management software 142, the renaming module 144, and the data store 146. As discussed above, each of the firmware 140, the management software 142, the renaming module 144, and the data store 146 may be formed by the computer executable code or instructions executable at the processor 112. In certain embodiments, each of the firmware 140, the management software 142, the renaming module 144, and the data store 146 may further include sub-modules. Alternatively, in certain embodiments, some or all of the firmware 140, the management software 142, the renaming module 144, and the data store 146 may be combined to form a single module. In certain embodiments, the storage device 116 may store other applications independent from the firmware 140, the management software 142, the renaming module 144, and the data store 146.

The firmware 140 stored in the storage device 116 includes the computer executable code that may be executed at the processor 112 to enable the operations of the management device 110. In certain embodiments, the firmware 140 may include one or more modules or software components that may be executed independently. In certain embodiments, the management software 142, the renaming module 144, and the data store 146 may be a part of the firmware 140. In certain embodiments, each of the management software 142, the renaming module 144, and the data store 146 may respectively be a separate software module independent from the firmware 140.

The management software 142 is a software application configured to perform management of the managed nodes 120. In certain embodiments, based on the types of the managed nodes 120 being managed by the management device 110, the management software 142 may include multiple software modules or sub-modules to provide various different management functions. For example, when the management device 110 is a chassis management controller, the management software 142 may include a module performing management of the chassis, and a module performing management of components such as blade servers, which are installed in the chassis.

The renaming module 144 is a software module configured to provide the mass renaming process. In certain embodiments, the renaming module 144 may be a part of the management software 142. Alternatively, in certain embodiments, the renaming module 144 may be independent from the management software 142.

The data store 146 is a database for storing necessary data of the firmware 140 and the management software 142. In certain embodiments, the data stored in the data store 146 may include, without being limited thereto, information of the properties of the managed nodes 120, which includes identification information of the managed nodes 120. In certain embodiments, the properties of the managed nodes 120 may be used as the predetermined dynamic keys in the mass renaming process. Examples of the properties or identification information of the managed nodes 120 may include, without being limited thereto, a group identification number of each node 120, an Internet protocol (IP) address of each node 120, a media access control (MAC) address of each node 120, a model of each node 120, manufacturer information of each node 120, or any other types of information that may be used to identify the managed nodes 120.

Each of the managed node 120 is an item being managed by the management software 142 on the management device 110. In certain embodiments, the items being managed by the management software 142 may not necessarily be a managed node, but may be in other forms. For example, the items being managed by the management software 142 may include a plurality of clusters, and each cluster includes multiple nodes. In certain embodiments, the management software 142 may be used to manage different levels of items, such as the nodes and clusters, and each level of items may form a separate list of items.

The remote computing device 140 is a computing device being communicatively connected to the management device 110 via the network 130. Examples of the remote computing devices 120 may include, without being limited to, desktop computers, laptop computers, tablet computers, smartphones, or any other types of computing devices. In certain embodiments, the remote computing device 140 may be one of the managed nodes 120 being managed by the management device 110.

As discussed above, the data stored in the data store 146 may include properties of the managed nodes 120, which may be used as the predetermined dynamic keys in the mass renaming process. For example, when the management device 110 is a chassis management controller, a backplane controller or an enclosure management controller that controls a plurality of blade servers as the managed nodes 120, each blade server may be installed to the chassis/backplane/enclosure via a corresponding slot. Thus, each blade server may have a corresponding slot identification number that identifies the corresponding slot, and the slot identification number may be used as the predetermined dynamic key.

Figure 2:
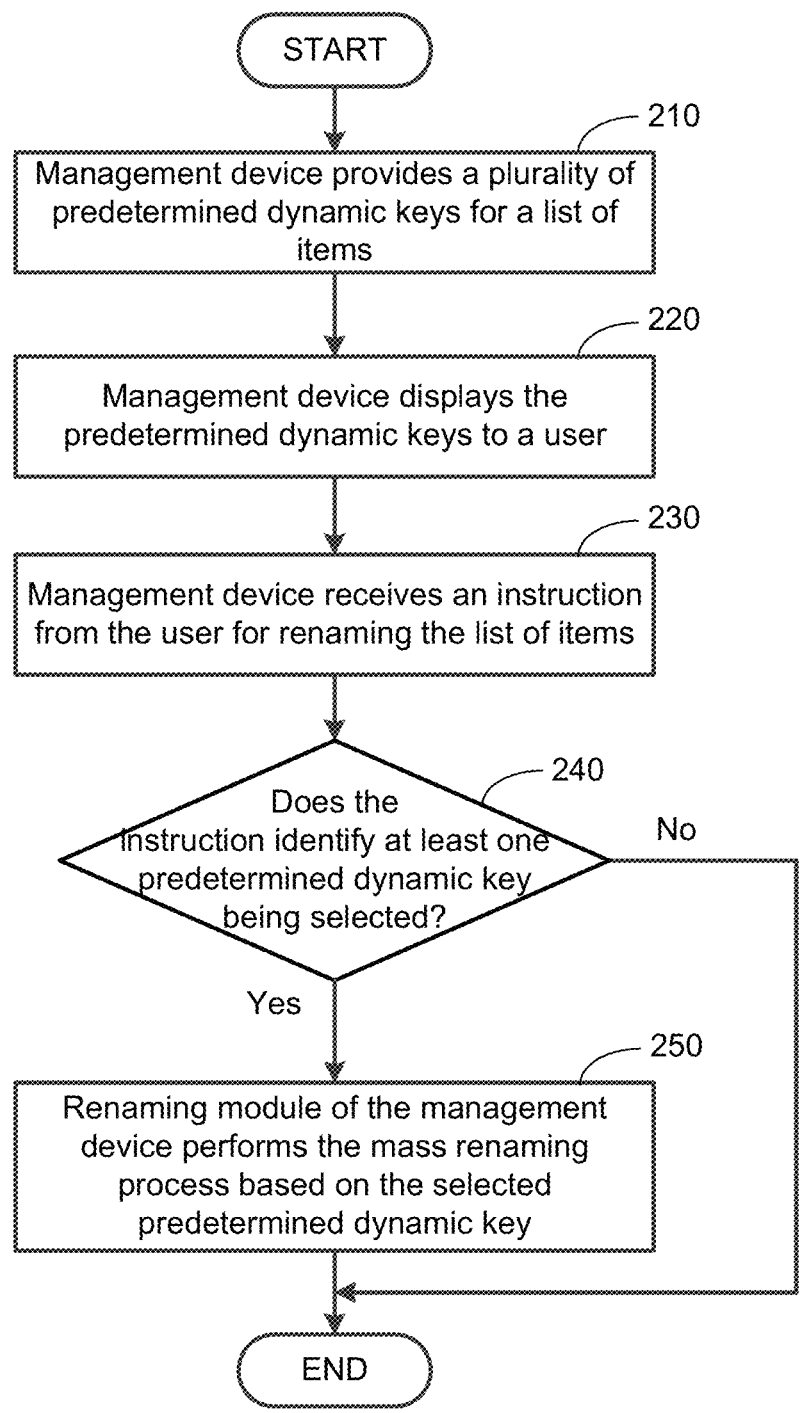
FIG. 2 depicts a flowchart of a mass renaming process of a list of items at run-time according to certain embodiments of the present disclosure.

FIG. 2 depicts a flowchart of a mass renaming process of a list of items at run-time according to certain embodiments of the present disclosure. In certain embodiments, the method as shown in FIG. 2 may be implemented by a system as shown in FIG. 1 for performing a mass renaming process of a list of items at run-time on a management device 110. In certain embodiments, the items being renamed may be the managed nodes 120, and the method may be implemented by the renaming module 144 of the management device 110 of the system 100 as shown in FIG. 1. It should be particularly noted that, unless otherwise stated in the present disclosure, the steps of the method may be arranged in a different sequential order, and are thus not limited to the sequential order as shown in FIG. 2.

As shown in FIG. 2, at procedure 210, the management device 110 may provide a plurality of predetermined dynamic keys for a list of items (e.g., the managed nodes 120). In certain embodiments, the predetermined dynamic keys may be the properties of the managed nodes 120, which are stored in the data store 146 of the management device 110. For example, when the management device 110 is a chassis management controller, a backplane controller or an enclosure management controller, and the managed nodes 120 are the blade servers being managed by the management device 110, one of the predetermined dynamic keys may be the slot identification numbers of the blade servers.

At procedure 220, the management device 110 may display the predetermined dynamic keys to a user, such that the user understands the format of each dynamic key to be used in an instruction for renaming the items (e.g., the managed nodes 120). In certain embodiments, the management device 110 may provide a HELP file which is accessible by the user to show the formats of the dynamic key to be used in the instruction. For example, when one of the predetermined dynamic keys may be the slot identification numbers of the blade servers, the user may include a command of <slot-id> in the instruction to indicate the slot identification number as a selected dynamic key to be used in the renaming process.

At procedure 230, the management device 110 may receive an instruction from the user for renaming the list of items (e.g., the managed nodes 120). In certain embodiments, a user at the remote computing device 120 may type in an instruction to be sent to the management device 110. For example, the instruction may include a command of "blade in slot <slot-id>", indicating that each of the items (blade servers in this case) may be renamed as "blade in slot N," where N is the slot identification number of each blade server (i.e., the item to be renamed). In certain embodiments, multiple dynamic keys may be used in the instruction to form a more complicated naming pattern.

In certain embodiments, the instruction may further include information that identifies the list of items to be renamed from a plurality of lists of items. For example, when the system also include a plurality of clusters being formed by the blade servers, the instruction must identify whether the blade servers or the clusters are the items to be renamed.

Figure 3:
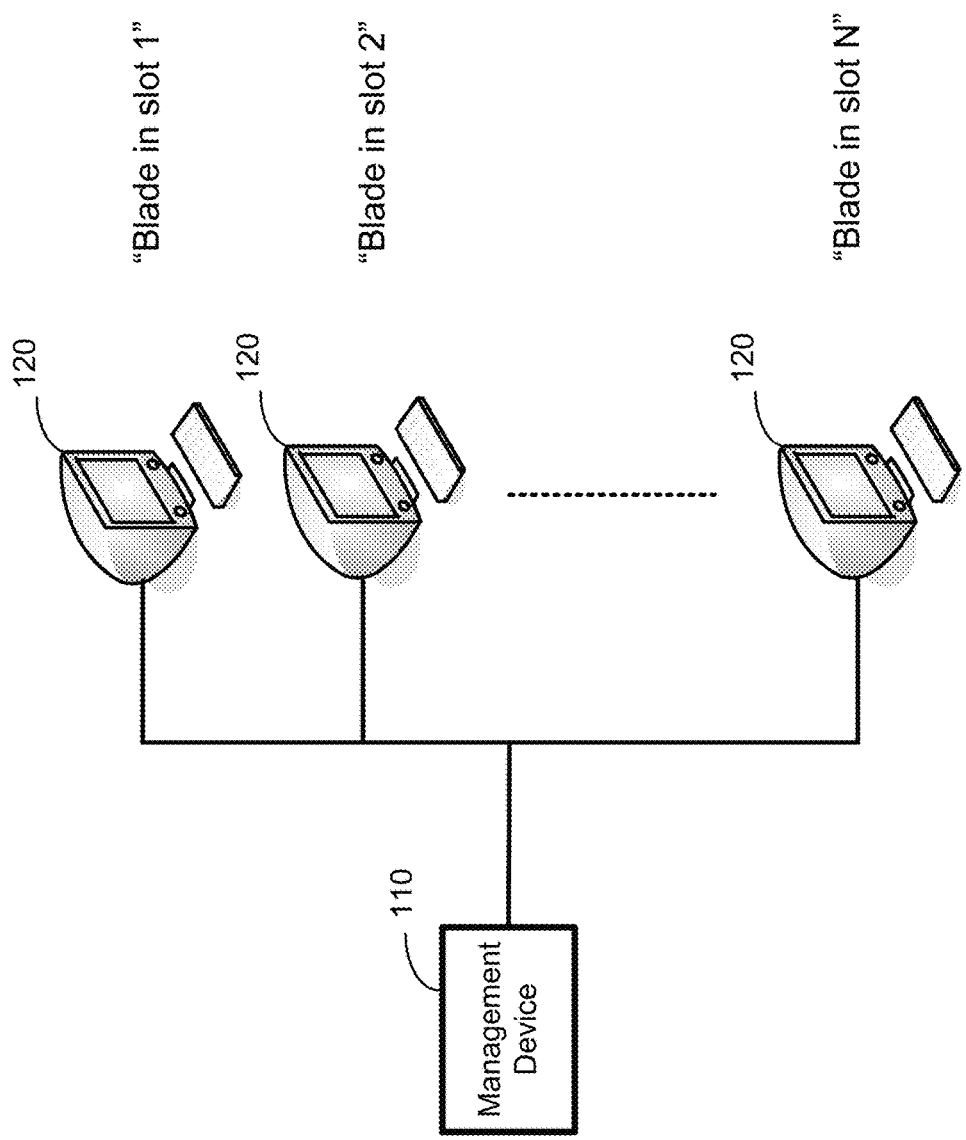
FIG. 3 schematically depicts a system where the managed nodes are renamed as "blade in slot N" by the mass renaming process according to certain embodiments of the present disclosure.

Upon receiving the instruction, at procedure 240, the renaming module 144 of the management device 110 may determine whether the instruction identifies at least one predetermined dynamic key being selected. For example, if the instruction includes a command of "blade in slot <slot-id>", the renaming module 144 may retrieve the information from the instruction and identify, from the parameter <slot-id>, that the slot identification number of each blade server is selected as a dynamic key used in the renaming process. If the instruction does not identify any of the predetermined dynamic key, the process ends. On the other hand, if the renaming module 144 identifies the predetermined dynamic key (or multiple dynamic keys) to be selected, at procedure 250, the renaming module 144 may perform the mass renaming process at run-time based on the selected predetermined dynamic key (or dynamic keys). In this case, the names of the items (e.g., the blade servers) will be automatically renamed to become "blade in slot 1," "blade in slot 2," etc. FIG. 3 schematically depicts a system where the managed nodes are renamed as "blade in slot N" by the mass renaming process according to certain embodiments of the present disclosure. As shown in FIG. 3, the managed node 120 (i.e., the blade server) having the slot identification number "1" is renamed as "blade in slot 1," the managed node 120 (i.e., the blade server) having the slot identification number "2" is renamed as "blade in slot 2," and the managed node 120 (i.e., the blade server) having the slot identification number "N" is renamed as "blade in slot N."

In the embodiment as described above, the slot identification number is used as the predetermined dynamic key being selected. Since the slot identification number for each blade server is a unique number, the single predetermined dynamic key being selected would be sufficient for the mass renaming process. In certain embodiments, however, when other properties of the managed nodes 120 are selected as the predetermined dynamic keys in the mass renaming process, it may be necessary to select multiple predetermined dynamic keys (e.g., multiple properties of the managed nodes 120) to avoid duplicate naming problems if it is uncertain whether each predetermined dynamic key has a unique corresponding value for each of the items (i.e., the managed nodes 120) being renamed. In certain embodiments, the renaming process may further introduce other parameters as a part of the predetermined dynamic keys to avoid duplicate naming.

In a further aspect, the present disclosure is related to a non-transitory computer readable medium storing computer executable code. The code, when executed at a processor of a controller, may perform the method as described above. In certain embodiments, the non-transitory computer readable medium may include, but not limited to, any physical or virtual storage media storing the firmware of the management device. In certain embodiments, the non-transitory computer readable medium may be implemented as the storage device 116 of the management device 110 as shown in FIG. 1.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A system, comprising:
   a plurality of blade servers, wherein each of the blade servers has a corresponding slot identification number; and
   a management device configured to control the blade servers and manage a list of the blade servers, the management device comprising a processor and a memory storing computer executable code, wherein the computer executable code, when executed at the processor, is configured to:
      provide a plurality of predetermined dynamic keys for the list of the blade servers, wherein each of the predetermined dynamic keys for the list of the blade servers comprises the corresponding slot identification number of each of the blade servers;
      receive an instruction from a user;
      determine whether the instruction is a blade server instruction for renaming the list of the blade servers, wherein the blade server instruction comprises information for selecting at least one of the predetermined dynamic keys for the list of the blade servers; and
      in response to determining that the instruction is the blade server instruction, rename the blade servers at run-time using the at least one of the predetermined dynamic keys for the list of the blade servers being selected.

2. The system of claim 1, further comprising a computing device communicatively connected to the management device via a network, wherein the instruction is received by the management device from the computing device.

3. The system of claim 1, wherein each of the predetermined dynamic keys for the list of the blade servers further comprises identification information of the blade servers.

4. The system of claim 3, wherein the identification information of the blade servers comprises:
   a group identification number of each of the blade servers;
   an Internet protocol (IP) address of each of the blade servers;
   a media access control (MAC) address of each of the blade servers;
   a model of each of the blade servers; and
   manufacturer information of each of the blade servers.

5. The system of claim 1, wherein the computer executable code, when executed at the processor, is further configured to:
   display the predetermined dynamic keys for the list of the blade servers to the user.

6. The system of claim 1, wherein the instruction further comprises information for selecting, from a plurality of lists of the blade servers, the list of the blade servers to be renamed.

7. The system of claim 1, wherein the management device is a chassis management controller, a backplane controller or an enclosure management controller controlling the blade servers as a plurality of managed nodes.

8. The system of claim 1, wherein the blade servers form a plurality of clusters, each of the clusters comprises two or more of the blade servers, and the computer executable code, when executed at the processor, is further configured to:
   provide a plurality of predetermined dynamic keys for a list of the clusters, wherein each of the predetermined dynamic keys for the list of the clusters comprises identification information of each of the clusters;
   determine whether the instruction is a cluster instruction for renaming the list of the clusters, wherein the cluster instruction comprises information for selecting at least one of the predetermined dynamic keys for the list of the clusters; and
   in response to determining that the instruction is the cluster instruction, rename the clusters at run-time using the at least one of the predetermined dynamic keys for the list of the clusters being selected.

9. A method for performing mass renaming of a list of blade servers at run-time with variable differentiation factors, comprising:
   providing, by a management device, a plurality of predetermined dynamic keys for a list of a plurality of blade servers, wherein the management device is configured to control the blade servers and manage the list of the blade servers, each of the blade servers has a corresponding slot identification number, and each of the predetermined dynamic keys for the list of the blade servers comprises the corresponding slot identification number of each of the blade servers;

receiving, by the management device, an instruction from a user;

determining, by the management device, whether the instruction is a blade server instruction for renaming the list of the blade servers, wherein the blade server instruction comprises information for selecting at least one of the predetermined dynamic keys for the list of the blade servers; and in response to determining that the instruction is the blade server instruction, renaming, by the management device, the blade servers at run-time using the at least one of the predetermined dynamic keys for the list of the blade servers being selected.

10. The method of claim 9, wherein the instruction is received by the management device from a computing device communicatively connected to the management device via a network.

11. The method of claim 9, wherein each of the predetermined dynamic keys for the list of the blade servers further comprises identification information of the blade servers.

12. The method of claim 11, wherein the identification information of the blade servers comprises:
 a group identification number of each of the blade servers;
 an Internet protocol (IP) address of each of the blade servers;
 a media access control (MAC) address of each of the blade servers;
 a model of each of the blade servers; and
 manufacturer information of each of the blade servers.

13. The method of claim 9, further comprising:
 displaying, by the management device, the predetermined dynamic keys for the list of the blade servers to the user.

14. The method of claim 9, wherein the instruction further comprises information for selecting, from a plurality of lists of the blade servers, the list of the blade servers to be renamed.

15. The method of claim 9, wherein the blade servers form a plurality of clusters, each of the clusters comprises two or more of the blade servers, and the method further comprises:
 providing, by the management device, a plurality of predetermined dynamic keys for a list of the clusters, wherein each of the predetermined dynamic keys for the list of the clusters comprises identification information of each of the clusters;
 determining, by the management device, whether the instruction is a cluster instruction for renaming the list of the clusters, wherein the cluster instruction comprises information for selecting at least one of the predetermined dynamic keys for the list of the clusters; and
 in response to determining that the instruction is the cluster instruction, renaming, by the management device, the clusters at run-time using the at least one of the predetermined dynamic keys for the list of the clusters being selected.

16. A non-transitory computer readable medium storing computer executable code, wherein the computer executable code, when executed at a processor of a management device, is configured to:

provide a plurality of predetermined dynamic keys for a list of a plurality of blade servers managed by the management device, wherein the management device is configured to control the blade servers and manage the list of the blade servers, each of the blade servers has a corresponding slot identification number, and each of the predetermined dynamic keys for the list of the blade servers comprises the corresponding slot identification number of each of the blade servers;

receive an instruction from a user;

determine whether the instruction is a blade server instruction for renaming the list of the blade servers, wherein the blade server instruction comprises information for selecting at least one of the predetermined dynamic keys for the list of the blade servers; and in response to determining that the instruction is the blade server instruction, rename the blade servers at run-time using the at least one of the predetermined dynamic keys for the list of the blade servers being selected.

17. The non-transitory computer readable medium of claim 16, wherein each of the predetermined dynamic keys for the list of the blade servers further comprises identification information of the blade servers.

18. The non-transitory computer readable medium of claim 17, wherein the identification information of the blade servers comprises:
 a group identification number of each of the blade servers;
 an Internet protocol (IP) address of each of the blade servers;
 a media access control (MAC) address of each of the blade servers;
 a model of each of the blade servers; and
 manufacturer information of each of the blade servers.

19. The non-transitory computer readable medium of claim 16, wherein the management device is a chassis management controller, a backplane controller or an enclosure management controller controlling the blade servers as a plurality of managed nodes.

20. The non-transitory computer readable medium of claim 16, wherein the blade servers form a plurality of clusters, each of the clusters comprises two or more of the blade servers, and the computer executable code, when executed at the processor of the management device, is further configured to:
 provide a plurality of predetermined dynamic keys for a list of the clusters, wherein each of the predetermined dynamic keys for the list of the clusters comprises identification information of each of the clusters;
 determine whether the instruction is a cluster instruction for renaming the list of the clusters, wherein the cluster instruction comprises information for selecting at least one of the predetermined dynamic keys for the list of the clusters; and
 in response to determining that the instruction is the cluster instruction, rename the clusters at run-time using the at least one of the predetermined dynamic keys for the list of the clusters being selected.

\* \* \* \* \*